(12) United States Patent
Handlin, Jr. et al.

(10) Patent No.: US 7,001,956 B2
(45) Date of Patent: Feb. 21, 2006

(54) ARTICLES PREPARED FROM HYDROGENATED BLOCK COPOLYMERS

(75) Inventors: Dale Lee Handlin, Jr., Houston, TX (US); Carl Lesley Willis, Houston, TX (US); Hendrik de Groot, Ottignies Louvain-la Neuve (BE); Margaret Ann Burns Clawson, Houston, TX (US); Gert Joly, Ottignies Louvain-la Neuve (BE); Catherine Maris, Ottignies Louvain-la Neuve (BE); Lie Djiauw, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 79 days.

(21) Appl. No.: 10/453,993

(22) Filed: Jun. 4, 2003

(65) Prior Publication Data

US 2003/0225209 A1 Dec. 4, 2003

Related U.S. Application Data

(60) Provisional application No. 60/385,663, filed on Jun. 4, 2002.

(51) Int. Cl.
*C08C 19/25* (2006.01)

(52) U.S. Cl. .................. 525/342; 525/901; 526/337; 526/347.1; 526/938

(58) Field of Classification Search ............. 526/337, 526/347.1, 938; 525/342, 901
See application file for complete search history.

(56) References Cited

U.S. PATENT DOCUMENTS

| | | | |
|---|---|---|---|
| 3,149,182 A | 9/1964 | Porter | |
| 3,244,664 A | 4/1966 | Zelinski et al. | |
| 3,281,383 A | 10/1966 | Zelinski et al. | |
| 3,494,942 A | 2/1970 | Miki et al. | |
| RE27,145 E | 6/1971 | Jones | |
| 3,594,452 A | 7/1971 | De La Mare et al. | |
| 3,595,942 A | 7/1971 | Wald et al. | |
| 3,634,594 A | 1/1972 | Hiyama | |
| 3,670,054 A | 6/1972 | De La Mare et al. | |
| 3,692,874 A | 9/1972 | Farrar et al. | |
| 3,700,633 A | 10/1972 | Wald et al. | |
| 3,766,301 A | 10/1973 | De La Mare et al. | |
| 3,880,954 A | 4/1975 | Kahle et al. | |
| 3,985,830 A | 10/1976 | Fetters et al. | |
| 4,076,915 A | 2/1978 | Trepka | |
| 4,104,326 A | 8/1978 | Fodor | |
| 4,104,332 A | 8/1978 | Zelinski | |
| 4,185,042 A | 1/1980 | Verkouw | |
| 4,379,891 A | 4/1983 | Haynes | |
| 4,408,017 A | 10/1983 | Martin | |
| 5,075,377 A | 12/1991 | Kawabuchi et al. | |
| 5,266,649 A | 11/1993 | Balas et al. | |
| 5,272,214 A | 12/1993 | Custro et al. | |
| 5,420,203 A | 5/1995 | Dillman et al. | |
| 5,486,574 A | 1/1996 | Himes et al. | |
| 5,532,319 A | 7/1996 | Asahara et al. | |
| 5,552,493 A | 9/1996 | Spence et al. | |
| 5,681,895 A | 10/1997 | Bening et al. | |
| 6,723,686 B1 | 4/2004 | Calle et al. | |

FOREIGN PATENT DOCUMENTS

| | | |
|---|---|---|
| CN | 1073950 | 7/1993 |
| CN | 1241582 | 1/2000 |
| EP | 0 404 185 A2 | 6/1990 |
| EP | 404185 A2 * | 12/1990 |
| EP | 0 541 180 A2 | 5/1992 |
| EP | 0 669 350 A1 | 2/1995 |
| EP | 0 745 635 A1 | 5/1996 |
| EP | 1 233 028 A1 | 9/2000 |
| EP | 1 233 028 A1 | 8/2002 |
| JP | 06-279744 | 10/1994 |
| JP | 07-238207 | 9/1995 |
| JP | 2001310988 | 11/2001 |
| WO | 92/20725 | 11/1992 |
| WO | 03/066697 A1 | 8/2003 |

* cited by examiner

*Primary Examiner*—Robert D. Harlan

(57) ABSTRACT

The present invention relates to articles prepared from novel anionic block copolymers of mono alkenyl arenes and conjugated dienes, and to blends of such block copolymers with other polymers. The block copolymers are selectively hydrogenated and have mono alkenyl arene end blocks and conjugated diene mid blocks. The block copolymer may be blended with at least one other polymer selected from the group consisting of olefin polymers, styrene polymers, amorphous resins and engineering thermoplastic resins.

53 Claims, No Drawings

ARTICLES PREPARED FROM HYDROGENATED BLOCK COPOLYMERS

The present application claims priority from commonly assigned U.S. patent application Ser. No. 60/385,663, filed Jun. 4, 2002, entitled Process for Preparing Block Copolymer and Resulting Composition (W-0002 prov.), and from it's continuing application filed concurrently with this application (W-0002A conv.), Ser. No. 10/454,237.

BACKGROUND OF THE INVENTION

1. Field of the Invention

This invention relates to articles prepared from novel anionic block copolymers of mono alkenyl arenes and conjugated dienes, and to blends of such block copolymers with other polymers. The invention also relates to formed articles and methods for forming articles from such novel block copolymers.

2. Background of the Art

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and Re. 27,145. Since then, a large number of new styrene diene polymers have been developed. Now a novel anionic block copolymer based on mono alkenyl arene end blocks and conjugated diene mid blocks and having a predominately linear structure prepared with an alkoxy silane coupling agent has been discovered and is described in copending, commonly assigned U.S. patent application Ser. No. 60/385,663, entitled "Process for Preparing Block Copolymer and Resulting Composition". Methods for making such polymers are described in detail in the above-mentioned patent application.

What has now been found is that blends or compounds of these novel block copolymers with processing oils and other polymers have surprising property advantages, and show promising utility in a variety of end-use applications, including injection molding, extruded goods and polymer modifications.

SUMMARY OF THE INVENTION

In one aspect of the present invention we have discovered that a novel composition comprising at least one hydrogenated block copolymer having a predominately linear structure and being made with an alkoxy silane coupling agent has superior properties for many applications. We have also discovered that these compositions can be used in various forming processes, and that they also have a number of advantages in processing.

Accordingly, the broad aspect of the present invention is an article comprising at least one hydrogenated block copolymer composition and, optionally, at least one other component selected from the group consisting of olefin polymers, styrene polymers, tackifying resins, polymer extending oils and engineering thermoplastic resins. The hydrogenated block copolymer composition has A polymer blocks and B polymer blocks wherein prior to hydrogenation it has the structure comprising: a. a tetra-branched block copolymer (IV) having a number average molecular weight of 100,000 to 800,000 represented by the general formula $(A-B)_4X$; b. a tri-branched block copolymer (III) having a number average molecular weight of 75,000 to 600,000 represented by the general formula $(A-B)_3X$; c. a di-branched block copolymer (II) having a number average molecular weight of 50,000 to 400,000 represented by the general formula $(A-B)_2X$; and d. a linear diblock copolymer (I) having a number average molecular weight of 25,000 to 200,000 represented by the general formula A-B; where: i) A represents a polymer block of a mono alkenyl arene; ii) B represents a polymer block of a conjugated diene; iii) X represents the residue of an alkoxy silane coupling agent; and iv) the relative amounts of copolymers I, II, III and IV are 0 to 5 weight percent IV, 0 to 60 weight percent III, 40 to 95 weight percent II and 2 to 10 weight percent I, where the total of I, II, III and IV equals 100 weight percent. The alkoxy silane coupling agent has the formula $R_x$—Si—$(OR')_y$, where x is 0 or 1, x+y=4, and R and R' are the same or different, R is selected from aryl hydrocarbon radicals, linear alkyl hydrocarbon radicals and branched alkyl hydrocarbon radicals, and R' is selected from linear and branched alkyl hydrocarbon radicals having 1 to 12 carbon atoms. Also included are analogous CDE block copolymers where the C and E blocks are the same or different conjugated blocks and the D block is a mono alkenyl arene block.

In another aspect of the present invention we have shown that the article can be formed in a wide variety of processes, including injection molding, compression molding, over molding, dipping, extrusion, roto molding, slush molding, fiber spinning, blow molding, polymer modification, cast film making, blown film making and foaming.

In yet another aspect of the present invention, the article can be processed into the form of a film, sheet, multi layer laminate, coating, band, strip, profile, molding, foam, tape, fabric, thread, filament, ribbon, fiber, plurality of fibers, or fibrous web.

Finally, the copolymers of the present invention can be compounded with other components not adversely affecting the copolymer properties. Exemplary materials that could be used as additional components would include, without limitation, pigments, antioxidants, stabilizers, surfactants, waxes, and flow promoters. The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polyvinyl chloride, polystyrene, polyamide, polyurethane, polyester, polycarbonate and epoxy resins. The polymers of the present invention are also useful in alloys and blends, and as compatibilizers for a variety of polymers and other materials.

DETAILED DESCRIPTION OF THE PREFERRED EMBODIMENTS

The key component of the present invention is the novel block copolymer composition. The process for making such a block copolymer is described and claimed in the 60/385,663 provisional patent application and the conventional U.S. patent application claiming priority from the '663 application, filed concurrently with this application.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Preferred dienes include 1,3-butadiene and isoprene. In some cases the dienes may be a mixture of 1,3-butadiene and isoprene. In some cases 1,3-butadiene is most preferred. As used herein, and in the claims, "butadiene" refers specifically to "1,3-butadiene".

A key aspect of the present invention is the coupling agent used to prepare the novel polymer. As stated above, the coupling agent used in the present invention is an alkoxy silane of the general formula $R_x$—Si—$(OR')_y$, where x is 0 or 1, x+y=4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Preferred tetra alkoxy silanes are tetramethoxy silane ("TMSi"), tetraethoxy silane ("TESi"), tetrabutoxy silane ("TBSi"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

It is also important to control the molecular weight of the various blocks. For each A block the desired block weights are 3,000 to about 60,000, preferably about 5,000 to about 50,000. For each B block the desired block weights are about 20,000 to about 200,000, preferably about 25,000 to about 150,000. Regarding the CDE block copolymer composition, for each D block the desired block weights are 3,000 to about 60,000, preferably about 5,000 to about 50,000. For each E block the desired block weights are about 20,000 to about 200,000, preferably about 20,000 to about 150,000. For each C block the desired block weights are about 1,000 to about 25,000, preferably about 3,000 to about 15,000. These molecular weights are most accurately determined by light scattering measurements, and are expressed as number average molecular weights.

The relative amounts of the tetra-branched (IV), tri-branched (III), di-branched (II) and linear diblock (I) species are: 0 to 5 weight percent tetra-branched IV, 0 to 60 weight percent tri branched III, 40 to 95 weight percent di-branched II and 2 to 10 weight percent linear diblock I. Preferred amounts are: 0 to 5 weight percent IV, 0 to 36 weight percent III, 60 to 95 weight percent II and 4 to 8 weight percent I.

The block copolymer composition has a Coupling Efficiency ("CE") of about 90 to 98 weight percent, preferably about 92 to about 96 weight percent. Coupling Efficiency is defined as the proportion of polymer chain ends which were living, P—Li, at the time the coupling agent was added that are linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled plus the area under the curve for the starting, uncoupled polymer species (I+II+III+IV). This ratio is multiplied by 100 to convert the coupling efficiency to a percentage value.

The percentage of A and D blocks in the block copolymer composition is desired to be about 5 to about 50 weight percent, preferably about 10 to about 40 weight percent.

Another important aspect of the present invention is to control the microstructure or vinyl content of the conjugated diene in the B block. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 10 to 80 mol percent of the condensed butadiene units in the polymer block have a 1,2-addition configuration. Preferably, from about 30 to about 80 mol percent of the condensed butadiene units should have 1,2-addition configuration. When referring to the use of isoprene as the conjugated diene, it is preferred that about 5 to 80 mol percent of the condensed isoprene units in the block have 3,4-addition configuration. Polymer microstructure (mode of addition of the conjugated diene) is effectively controlled by addition of an ether, such as diethyl ether, a diether such as 1,2-diethoxypropane, or an amine as a microstructure modifier to the diluent. Suitable ratios of microstructure modifier to lithium polymer chain end are disclosed and taught in U.S. Re. 27,145.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

The hydrogenated block copolymer may be compounded with a polymer extending oil. Especially preferred are the types of oil that are compatible with the elastomeric segment of the block copolymer. While oils of higher aromatics content are satisfactory, those petroleum-based white oils having low volatility and less than 50% aromatic content are preferred. Typical paraffinic processing oils can be used to soften and extend polymers of the present invention; however, processing oils with a higher naphthenic content are more compatible with the rubber block. Processing oils with a naphthenic content between 40% and 55% and an aromatic content less than 10% are preferred. The oils should additionally have low volatility, preferable having an initial boiling point above about 500° F. The amount of oil employed varies from about 5 to about 300 parts by weight per hundred parts by weight rubber, or block copolymer, preferably about 20 to about 150 parts by weight.

The block copolymers of the present invention may be blended with a large variety of other polymers, including olefin polymers, styrene polymers, tackifying resins, and engineering thermoplastic resins.

In addition, the block polymers of the present invention may be blended with conventional styrene/diene and hydrogenated styrene/diene block copolymers, such as the styrene block copolymers available from KRATON Polymers. These styrene block copolymers include linear S-B-S, S-I-S, S-EB-S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are polyvinyl chloride (PVC) and blends of PVC with other materials. The amount of olefin polymer employed varies from about 5 to about 100 parts by weight per hundred parts by weight rubber, or block copolymer, preferably about 20 to about 50 parts by weight.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene and styrene/olefin copolymers. Representative styrene/olefin copolymers are substantially random ethylene/styrene or propylene/styrene copolymers, preferably containing at least 20 weight percent copolymerized styrene monomer. The amount of styrene polymer employed varies from about 5 to about 100 parts by weight per hundred parts by weight rubber, or block copolymer, preferably about 20 to about 50 parts by weight.

Also included are styrene-grafted polypropylene polymers, such as those offered under the tradename Interloy®, originally developed by Himont, Inc. (now Basell).

For the purposes of the specification and claims, the term "engineering thermoplastic resin" encompasses the various polymers found in the classes listed in Table A below, and further defined in U.S. Pat. No. 4,107,131, the disclosure of which is hereby incorporated by reference.

TABLE A

Thermoplastic Polyester
Thermoplastic Polyurethane
Poly(aryl ether) and Poly(aryl sulfone)
Polycarbonate
Acetal resin
Polyamide
Halogenated thermoplastic TABLE A-continued Nitrile barrier resin
Poly(methyl methacrylate)
Cyclic olefin copolymers Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON". The amount of tackifying resin employed varies from about 5 to about 100 parts by weight per hundred parts by weight rubber, or block copolymer, preferably about 20 to about 50 parts by weight. Also, one may use both a polystyrene block compatible resin and a midblock compatible resin.

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention.

Examples of various fillers that can be employed are found in the 1971–1972 Modern Plastics Encyclopedia, pages 240–247. A reinforcement may be defined simply as the material that is added to a resinous matrix to improve the strength of the polymer. Most of these reinforcing materials are inorganic or organic products of high molecular weight. Various examples include calcium carbonate, talc, silica, clays, glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight calcium carbonate, based on the total weight of the resulting reinforced blend.

Regarding the relative amounts of the various ingredients, this will depend in part upon the particular end use and on the particular block copolymer that is selected for the particular end use. Table B below shows some notional compositions expressed in percent weight, which are included in the present invention. For the "Polymer" amount, a portion may include conventional styrene block copolymers.

TABLE B

Applications, Compositions and Ranges

| Application | Ingredients | Composition % w. |
|---|---|---|
| Injection Molded articles | Polymer | 25–85% |
| | Polyolefin | 5–50% |

TABLE B-continued

Applications, Compositions and Ranges

| Application | Ingredients | Composition % w. |
|---|---|---|
| | Oil | 10–75% |
| Injection Molded/Extrusion | Polymer | 55–90% |
| | PPO | 10–50% |
| | PS | 10–50% |
| | Engineering Plastic | 10–50% |
| | Oil | 0–50% |
| Personal Hygiene Films and Fibers | Polymer | 10–75% |
| | PE | 0–30% |
| | PP | 0–30% |
| | Tackifying Resin | 5–30% |
| | End Block Resin | 5–20% |
| Personal Hygiene Films and Fibers | Polymer | 50–90% |
| | PE | 0–30% |
| | PS | 0–20% |
| | Tackifying Resin | 0–40% |
| Personal Hygiene Films and Fibers | Polymer | 45–85% |
| | PS | 10–25% |
| | Oil | 5–30% |
| Cap Seals | Polymer | 25–90% |
| | Oil and/or Tackifying Resin | 0–50% |
| | PP | 0–50% |
| | Filler | 0–25% |
| | Lubricant | 0 to 3% |
| Engineering Thermoplastic Toughening | Polymer or Maleated Polymer | 5–30% |
| | Engineering thermoplastic, e.g. Nylon 6,6, TPU | 70–95% |
| Dipped Goods | Polymer | 60–100% |
| | Plasticizer, oil | 0–40% |
| Polymer Modification | Polymer | 5–95% |
| | PE, PP, PS | 95–5% |

The polymer of the present invention may be used in a large number of applications, either as a neat polymer or in a compound. The following various end uses and/or processes are meant to be illustrative, and not limiting to the present invention:

Polymer modification applications
Injection molding of toys, medical devices
Extruding films, tubing, profiles
Over molding applications for personal care, grips, soft touch applications, for automotive parts, such as airbags, steering wheels, etc
Dipped goods, such as gloves
Thermoset applications, such as in sheet molding compounds or bulk molding compounds for trays
Roto molding for toys and other articles
Slush molding of automotive skins
Thermal spraying for coatings
Blown film for medical devices
Blow molding for automotive/industrial parts
Films and fibers for personal hygiene applications
Tie layer for functionalized polymers

EXAMPLES

The following examples are provided to illustrate the present invention. The examples are not intended to limit the scope of the present invention and they should not be so interpreted. Amounts are in weight parts or weight percentages unless otherwise indicated.

Example 1

Various hydrogenated block copolymer compositions of the present invention were prepared according to the process disclosed in copending patent application Ser. No. 60/385,663 referenced above. The various polymers are shown in Table 1 below. These polymers were then used in the various applications described in the other Examples.

TABLE 1

Results for S-Bd-Li Coupling Using Tetramethoxysilane

| | Block Molecular Weight | | Si/Li | CE | Vinyl | Arm Distribution % | | | |
|---|---|---|---|---|---|---|---|---|---|
| Expt. | Step I | Step II | (mol/mol) | (%) | (%) | 1 | 2 | 3 | 4 |
| 1 | 28.3 | 59.0 | 0.45 | 95.2 | 38 | 5 | 46 | 49 | t |
| 2 | 28.2 | 61.2 | 0.45 | 95.9 | 38 | 4 | 51 | 43 | 2 |
| 3 | 28.2 | 64.1 | 0.45 | 93.2 | 38 | 7 | 45 | 46 | 2 |

"Block Molecular Weight" values are in thousands, "Si/Li" is the ratio of tetramethoxysilane coupling agent to s-BuLi initiator, "CE" is coupling efficiency, Vinyl refers to the 1,2-content of the butadiene portion of the polymer, 1 Arm is uncoupled diblock, 2 Arm is the linear triblock copolymer, 3, and 4 Arm polymers are radial in structure, and t stands for a trace.

The average mechanical properties of polymers prepared from the polymer hydrogenated in the presence of methanol (CE=95.7% after hydrogenation) are compared to those of the same compounds, but prepared with an S-EB-S sequentially polymerized triblock copolymer, in Table 2 below. The polymers were mixed with 200, 300 or 500 parts of Drakeol 34 supplied by Penrico, per hundred parts polymer. Samples were compression molded and tested according to ASTM D412. The properties of the compounds made with the coupled product of the present invention are quite comparable to those of the compounds made with the sequential triblock.

TABLE 2

Average Mechanical Properties Of Oiled Compounds Prepared From The Polymer Hydrogenated In The Presence Of Methanol

| Polymer | phr oil | Tensile Strength (MPa) | Elongation (%) | 100% Modulus (Pa) | 500% Modulus (Pa) | 1000% Modulus (Pa) | 1500% Modulus (Pa) |
|---|---|---|---|---|---|---|---|
| C1 | 200 | 6.6 | 1845 | 110 | 28 | 920 | 2700 |
| C1 | 300 | 3.2 | 1973 | 55 | 160 | 510 | 1190 |
| C1 | 500 | 1.6 | 2176 | 20 | 60 | 170 | 520 |
| 1 | 200 | 5.6 | 1788 | 100 | 300 | 910 | 2800 |
| 1 | 300 | 3.1 | 2026 | 30 | 90 | 380 | 1100 |
| 1 | 500 | 1.3 | 2011 | 15 | 40 | 180 | 680 |

Example 2

Compounds containing 21.7% block copolymer, 54.3% Drakeol 34, 23.9% Profax 6301 polypropylene and 0.1% Irganox 1010 were prepared. The polymers included Polymer 1 and Polymer 4 all according to the present invention, and C1, a sequentially prepared hydrogenated styrene/butadiene/styrene block copolymer used for comparison. Polymer 4 is similar to Polymer 1, but is prepared with a tetraethoxy silane coupling agent. The polymer and oil were mixed and allowed to absorb for several hours. The polypropylene pellets were added and the mixture was extruded in a 20 mm Berstorff twin screw extruder fitted with an underwater pelletizer. Plaques for testing were injection molded on a Krauss Maffai injection molder. Hardness and tensile properties were measured according to ASTM D412 both in the injection direction and the direction perpendicular to injection. The properties were found to be isotropic within experimental error and the averaged results are tabulated in Table 3:

TABLE 3

| Polymer | #1 | #4 | C1 (Comparison) |
|---|---|---|---|
| Shore A Hardness (10 Second) | 63 | 63 | 63 |
| Tensile Strength (MPa) | 2.5 | 2.3 | 2.8 |
| Elongation to Break (%) | 320 | 250 | 380 |
| 100% Modulus (MPa) | 1.9 | 2.0 | 1.9 |
| 300% Modulus (MPa) | 2.5 | | 2.6 |
| Tear Strength (KN/m) | 17 | 16 | 19 |
| Compression Set (%) | 28 | | 28 |

Example 3

Filled compounds containing 17.9% block copolymer, 44.75% Drakeol 34, 10.42% Profax 6301 polypropylene, 26.85% Vicron 25-11 calcium carbonate and 0.1% Irganox 1010 were prepared. Block copolymers included #2 and #4, according to the present invention, and C2 and C1, for comparison. C1 and C2 are both sequentially prepared hydrogenated SBS block copolymers. The polymer and oil were mixed and allowed to absorb for several hours. The polypropylene pellets and calcium carbonate were added and the mixture was extruded in a Berstorff twin screw extruder fitted with an underwater pelletizer. Plaques for testing were injection molded on a Krauss Maffai injection molder. Hardness and tensile properties were measured both in the injection direction and the direction perpendicular to injection. The properties were found to be isotropic within experimental error and the results are tabulated in Table 4. Surprisingly, the coupled polymers show equivalent strengths compared to the sequential comparisons.

TABLE 4

| Polymer | #2 | #4 | C2 | C1 |
|---|---|---|---|---|
| Shore A Hardness (10 Second) | 44 | 47 | 46 | 46 |
| Tensile Strength (MPa) | 3.9 | 4.1 | 3.6 | 4.6 |
| Elongation to Break % | 1070 | 1030 | 690 | 1150 |
| 100% Modulus (MPa) | 0.90 | 1.1 | 1.25 | 0.93 |
| 300% Modulus (MPa) | 1.3 | 1.6 | 2.1 | 1.4 |
| 500% Modulus (MPa) | 1.8 | 2.1 | 2.8 | 1.9 |
| Tear Strength (KN/M) | 15 | 17 | 19 | 16 |
| Compression Set (%) | 19 | NM | 19 | 22 |

Example 4

Highly coupled, very linear, and high vinyl content analogs of the polymers described in Example 1 were prepared using 1,2-diethoxypropane as the microstructure modifier instead of diethyl ether. The use of the tetraethoxysilane coupling technology described above gave the polymers described in Table 5.

Hydrogenation using the Co/Al technique described in Example 1 resulted in essentially no decoupling as assayed by GPC.

TABLE 5

Summary of Molecular Characteristics of Highly Coupled, High Vinyl S-E/B-S Polymers

| Sample Number | Dimension Linear Polymer | 1,2-Butadiene Content (%) | Coupling Efficiency (%) | Branched Polymer (%) (III + IV) | Linear Polymer (%) (II) | Uncoupled Polymer (%) (I) | Following Hydrogenation Uncoupled Polymer (%) |
|---|---|---|---|---|---|---|---|
| 5 | 7.9-54-7.9 | 69 | 91 | 31 | 60 | 9 | 8 |
| 6 | 6.4-55-6.4 | 68 | 93 | 27 | 66 | 7 | 7 |

A polymer of the $(CDE)_n X$ type, where n=1, 2, 3, or 4, was prepared using the coupling technology described in Example 1. Prior to coupling, the polymer was a living triblock copolymer, PBd-PS-PBd-Li. Coupling with tetraethoxysilane gave the highly linked polymer described in Table 6. This polymer was hydrogenated using Ni/Al to make an E/B-S-E/B-S-E/B, pentablock copolymer. As analyzed by GPC, there was no evidence of decoupling of this polymer during hydrogenation.

TABLE 6

Summary of Molecular Characteristics of Highly Coupled E/B-S-E/B-S-E/B Polymers

| Sample Number | Dimension Linear Polymer | 1,2-Bd Content (%) | Coupling Efficiency (%) | Branched Polymer (%) (III + IV) | Linear Polymer (%) (II) | Uncoupled Polymer (%) (I) | Following Hydrogenation Uncoupled Polymer (%) |
|---|---|---|---|---|---|---|---|
| 7 | 5.0-8.2-57-8.2-5.0 | 77 | 96 | 50 | 46 | 4 | 4 |

The polymers in Tables 5 and 6 were compounded with Moplen 340N polypropylene in a Werner-Pfleiderer twin screw extruder under the conditions noted in Table 7. The amounts of block copolymer and PP used in each example were 70 weight percent block copolymer and 30 weight percent polypropylene. Tubes were extruded at a melt temperature from 200 to 230° C. as noted. Injection molded plaques were also prepared for clarity and haze measurements. As shown in Table 7, the polymers of the current invention have better clarity than the comparative polymers C3 and C4, both high vinyl, selectively hydrogenated, sequentially polymerized SBS block copolymers.

right after the first one. Forces at 50 and 100% elongation are recorded for the first cycle. Hysteresis is measured as the difference in energy between the load and the unload step. Permanent set is measured as the difference between the original sample length of the first cycle (force equals zero) and the sample length before the second cycle (force equals zero).

Stress relaxation was also measured by clamping strands produced by melt index tester in a Zwick mechanical tester. Strands are elongated to 50% extension, in a hot-air oven at 40° C. The samples are held in that position for 2 hrs. The

TABLE 7

| SEBS | C3 | C4 | #5 | #6 | #7 |
|---|---|---|---|---|---|
| Type | SEBS | SEBS | (SEB)2 | (SEB)2 | (EBSEB)2 |
| Polymer structure | seq | seq | coupled | coupled | coupled |
| Vinyl content (%) | 68 | 65 | 69 | 68 | 77 |
| Coupling efficiency | | | 92 | 91 | 96 |
| WP extruder 275 rpm - 7.5 kg/h - 220° C. | | | | | |
| Tmelt (° C.) | 230 | 230 | 230 | 230 | 230 |
| Torque (%) | 60 | 50 | 50 | 50 | 50 |
| Tube extrusion | | | | | |
| Tmelt (° C.) | 230 | 215 | 215 | 215 | 200 |
| rpm | 20 | 35 | 50 | 65 | 60 |
| die-pressure (bar) | 35 | 20 | 20 | 20 | 35 |
| visual transparency | good | excellent | excellent | excellent | excellent |
| IM of 2 mm plates | | | | | |
| Injection pressure | high | medium | medium | low | Low |
| Transparency, % | 90 | 90 | 90 | 90 | 91 |
| Haze, % (ASTM D-1003) | 30 | 22 | 12 | 16 | 14 |
| Clarity, % (ASTM D-1746) | 64 | 94 | 94 | 98 | 82 |
| visual transparency | good | very good | excellent | excellent | excellent |
| Hardness, Shore A (30s) | 80 | 80 | 82 | 78 | 76 |

Example 5

Blends of the polymers of Example 4 (65% w) with polypropylene, Moplen HF568X (20% w), a tackifying resin, Regalite R-1125 (5% w) and an endblock resin, Kristallex F-100 (10% w) were made in a 25 mm Werner & Pfleiderer co-rotating twin-screw extruder with 49 L/D. Ingredients were pre-blended in a Papenmeier internal mixer, and fed into one feeding port. Strands were cooled in a water-bath a granulated using a strand-cutter.

Strands were produced on a Göttfert melt-index tester according to ASTM D1238-95 (230° C., 2.16 kg). Strands produced by the melt index tester were clamped in a Zwick mechanical tester. Strands are elongated to 150% extension at a speed of 100 mm/sec (load step), and immediately relaxed to zero force (unload step). A second cycle follows force decay is measured. The stress-relaxation is expressed as the ratio between the final force and the initial force.

TABLE 8

Properties of compounds containing high vinyl polymers.

| | type | 1 | 2 | 3 | 4 |
|---|---|---|---|---|---|
| C4 | linear tri-block | 65 | | | |
| #7 | coupled penta-block, high vinyl | | 65 | | |
| #5 | coupled tri-block | | | 65 | |
| #6 | coupled tri-block | | | | 65 |
| Valtec HH442H | | 20 | 20 | 20 | 20 |
| Kristallex F-100 | | 10 | 10 | 10 | 10 |
| Regalite R-1125 | | 5 | 5 | 5 | 5 |
| Irganox 1010 | | 0.2 | 0.2 | 0.2 | 0.2 |

TABLE 8-continued

Properties of compounds containing high vinyl polymers.

| type | 1 | 2 | 3 | 4 |
|---|---|---|---|---|
| Irganox PS800 | 0.4 | 0.4 | 0.4 | 0.4 |
| MFR | 30 | 44 | 32 | 57 |
| (230° C./2.16 kg) | | | | |
| strand data | | | | |
| Mod 50%, RT in MPa | 3.18 | 2.57 | 3.80 | 3.23 |
| Mod 100%, RT in MPa | 3.58 | 2.55 yield | 4.13 | 3.70 |
| Mod 50%, 40° C. t(0) in MPa | 2.83 | 2.10 | 3.50 | 3.09 |
| Mod 50%, 40° C. t(120) in MPa | 1.13 | 0.78 | 1.50 | 1.22 |
| F(t)/F(0) (%) | 40 | 37 | 43 | 39 |
| Permanent set (%) | 14 | 21 | 21 | 20 |

Table 8 shows that the compound prepared with polymers 5 and 6 are stiffer than the sequential S-EB-S control with lower permanent set. Compounds with Polymer 6 were surprisingly stiff and exhibited a yield stress. Coupled high vinyl tri-block copolymers 5 and 6 offer the benefit of combining processability (flow) and elastic properties, desired for the applications.

Example 6

Polymers #5, 6 and C5 of Example 7 were compounded with a tackifying resin, Regalrez R1126, and a low density polyethylene, Epolene C10, both from Eastman Chemical, in a Brabender mixer. The results are shown in Table 9.

TABLE 9

| Polymer | #5 Percent | #6 Percent | C5 Percent |
|---|---|---|---|
| Polymer | 68 | 68 | 68 |
| NA601 | 12 | 12 | 12 |
| Regalrez 1126 | 20 | 20 | 20 |
| Ethanox 330 | 0.02 | 0.02 | 0.02 |
| PROPERTIES | | | |
| Stress-Strain at 2 in/min | | | |
| Max. Stress at Break, MPa | 12.3 | 11.4 | 14 |
| Strain at Break, % | 7.8 | 8.3 | 6.9 |
| Stress at 100%, MPa | 1.0 | 0.68 | 1.5 |
| Stress at 300%, MPa | 2.15 | 1.5 | 1.8 |

TABLE 9-continued

| Polymer | #5 Percent | #6 Percent | C5 Percent |
|---|---|---|---|
| Hysteresis to 300 %, 3 cycle. | | | |
| Cycle 1 recovery | 62 | 76 | 55 |
| Permanent set (%) | 37 | 28 | 35 |

The polymers of the current invention show improved hysteresis recovery compared to the control SEBS C5.

Example 7

Various tetra-ethoxy silane coupled, hydrogenated styrene/butadiene block copolymers (i.e. $(A-B)_n X$ block copolymers) were made in a polymerization process similar to that described in Example 1 above, and the results are presented below in Table 10. The preparation of these polymers differed from that described in Example 1 in that 1) these polymers used tetraethoxysilane as the coupling agent, 2) prior to coupling the molecular weights of the blocks in the living block copolymer were smaller (PS-PBd-Li (A-B-Li)); and 3) a Ni/Al hydrogenation catalyst was used. Consistent with the results in Example 1, the coupling reaction proceeded to give a high level of coupled polymer with good linearity in the coupled product. Hydrogenation of these polymers proceeded with a minimum of degradation. The segment molecular weights for the coupled linear components of these mixtures are given under the heading "Dimension Linear Polymer", with the first and third numbers being the A block molecular weight in thousands of units, and the second or middle number being twice the B block molecular weight in thousands. Also given are the vinyl content of the butadiene units prior to hydrogenation ("(%1,2-butadiene content (%)"), coupling efficiency ("Coupling Efficiency (%)", the weight percent of linear 2-arm ("Linear Coupled Polymer (%) (II)" and radial three and four arm species ("Branched Polymer (%) (III+IV)"), arms %), the weight percent of diblock ("Uncoupled Polymer (%) (I)"), and the weight percent of uncoupled diblock copolymer following hydrogenation ("Following Hydrogenation Uncoupled Polymer (%)"). This later measurement is a ready analysis of the degree of degradation (decoupling) that occurred during hydrogenation. The increase in uncoupled polymer on hydrogenation was in the range of 1–3%; this level of decoupling is not significant from a product performance perspective. The product labeled 17 is a physical blend of products 14, 15 and 16.

TABLE 10

Summary of Molecular Characteristics of Highly Coupled S-E/B-S Polymers.

| Sample Number | Dimension Linear Polymer | 1,2-Butadiene Content (%) | Coupling Efficiency (%) | Branched Polymer (%) (III + IV) | Linear Triblock Copolymer (%) (II) | Uncoupled Polymer (%) (I) | Following Hydrogenation Uncoupled Polymer (%) |
|---|---|---|---|---|---|---|---|
| 8 | 5.5-94-5.5 | 38 | 96 | 39 | 57 | 4 | 6 |
| 9 | 5.4-71-5.4 | 38 | 96 | 43 | 53 | 4 | 7 |
| 10 | 5.3-72-5.3 | 48 | 98 | 30 | 68 | 2 | 3 |
| 11 | 6.2-58-6.2 | 38 | 94 | 27 | 67 | 6 | 6 |
| 12 | 5.7-50-5.7 | 39 | 95 | 24 | 71 | 5 | 6 |
| 13 | 5.3-50-5.3 | 38 | 94 | 28 | 66 | 6 | 7 |
| 14 | 5.5-52-5.5 | 39 | 96 | 21 | 75 | 4 | |

TABLE 10-continued

Summary of Molecular Characteristics of Highly Coupled S-E/B-S Polymers.

| Sample Number | Dimension Linear Polymer | 1,2-Butadiene Content (%) | Coupling Efficiency (%) | Branched Polymer (%) (III + IV) | Linear Triblock Copolymer (%) (II) | Uncoupled Polymer (%) (I) | Following Hydrogenation Uncoupled Polymer (%) |
|---|---|---|---|---|---|---|---|
| 15 | 5.5-52-5.5 | 39 | 96 | 21 | 75 | 4 | |
| 16 | 5.5-53-5.5 | 38 | 94 | 20 | 74 | 6 | |
| 17 | 5.5-50-5.5 | 38 | 96 | 21 | 75 | 4 | 6 |

Compounds were made with these polymers with varying amounts of low density polyethylene (Epolene C10 from Eastman or Petrothene NA601 from Equistar) and tackifying resin (Regalrez 1126 from Eastman or EMPR100 from Exxon). The compounds were made by tumbling the ingredients then feeding into a Berstorff twin screw extruder equipped with an underwater pelletizer. Pellets were then cast into film on a Davis Standard film line employing a single screw extruder. Films were tested according to ASTM D412 in the machine direction and in the transverse direction. Polymer C5, a hydrogenated styrene/butadiene block copolymer that has been coupled with a different coupling agent to 69% coupling efficiency has been included. It has a molecular weight similar to polymer #10. The data from these films is shown in Table 11:

TABLE 11

| Polymer | Units | C5 | 11 |
|---|---|---|---|
| Polymer content | % | 63 | 63 |
| Regalrez 1126 | % | 17 | 17 |
| PE, NA 601 or EPOLENE C-10 | % | 20 | 20 |
| Ethanox AO 330 | % | 0.15 | 0.15 |
| Tensile Properties | | | |
| Tensile strength | MPa | 14 | 40 |
| Ultimate elongation | % | 1000 | 800 |
| Modulus 100% | MPa | 1.5 | 2.0 |
| Modulus 300% | MPa | 1.8 | 3.7 |
| Cyclic hysteresis to 100% extension | | | |
| Recoverable energy after 1 cycle | % | 72 | 73 |
| Hysteresis set @ 1 cycle | % | 9 | 8 |
| Cyclic hysteresis to 300% extension | | | |
| Recoverable energy after 1 cycle | % | 55 | 55 |
| Hysteresis set @ 1 cycle | % | 35 | 30 |
| Stress Relaxation at 23 C. for 30 mins | | | |
| % stress decay @ 300% ext. | % | 32 | 31 |

The properties of the polymer of the current invention are superior to those of comparative polymer C5 (a hydrogenated SBS block copolymer made with a different coupling agent, and having a lower CE). When compared in the same formulation the polymer of the current invention is stiffer as measured by its 100 and 300% modulus values and has higher tensile strength than the comparative polymer.

Example 8

Polymer #17 of Example 7 was also compounded with tackifying resin, polystyrene and polyethylene in various ratios. These compounds were prepared, films cast, and tests conducted as described in Example 7.

TABLE 12

| Run # | 1 | 2 | 3 | 4 | 5 |
|---|---|---|---|---|---|
| Polymer #17 | 80 | 75 | 70 | 70 | 75 |
| REGALREZ 1126 | 20 | 20 | 20 | 20 | 13 |
| EPOLENE C-10 | | 5 | 10 | | 7 |
| PS-3500 | | | | 10 | 5 |
| Stress/Strain, film method | | | | | |
| Stress at break, MPa | 38.6 | 39.7 | 42.2 | 47 | 42 |
| Strain at break, % | 870 | 830 | 860 | 740 | 785 |
| 100% Modulus, MPa | 1.2 | 1.4 | 1.5 | 1.45 | 1.7 |
| 300% Modulus, MPa | 2.4 | 2.8 | 3.0 | 3.9 | 3.9 |
| Cyclic hysteresis to 100% extension | | | | | |
| Recoverable energy after 1 cycle | 91 | 88 | 83 | 89 | 85 |
| Hysteresis set @ 1 cycle | 4 | 5 | 6 | 4 | 5 |
| Cyclic hysteresis to 300% extension | | | | | |
| Recoverable energy after 1 cycle | 85 | 78 | 69 | 81 | 72 |
| Hysteresis set @ 1 cycle | 10 | 10 | 16 | 10 | 14 |
| 30 min. Stress Relaxation, 300% 23° C. | | | | | |
| % Loss | 22 | 27 | 30 | 36 | 32 |

The data in Table 12 show that the tensile and hysteresis properties of the polymer of the current invention are superior to that of C5 in a wide range of formulations with a wide range of ingredients. Table 12 also shows that the addition of polystyrene is even more effective at increasing modulus with retention of other properties than is low density polyethylene.

Example 9

Two of the polymers of Example 7 were compounded with low density polyethylene, Epolene C-10 supplied by Eastman Chemical Co., and a metallocene low density polyethylene, Exact 4023, which has a 0.88 density and 30 melt index, supplied by Exxon Chemical The results are compared with comparative polymer C5 in the same formulation in Table 13:

TABLE 13

| Composition, % weight | 1 | 2 | 3 |
|---|---|---|---|
| C5 | 50 | | |
| 8 | | 50 | |
| 9 | | | 50 |
| EpoleneC-10 | 10 | 10 | 10 |
| EXACT 4023, 0.88 30 MI | 40 | 40 | 40 |
| Tensile Properties | | | |
| Tensile Strength MPa | 15.2 | 22.3 | 25.3 |
| Elongation to break % | 950 | 890 | 830 |

TABLE 13-continued

| Composition, % weight | 1 | 2 | 3 |
|---|---|---|---|
| 100% Modulus MPa | 2.1 | 2.5 | 2.6 |
| 300% Modulus MPa | 3.2 | 4.0 | 4.1 |
| Hysteresis, 100% | | | |
| Recovery, % | 57 | 65 | 62 |
| Set, % | 14 | 10 | 11 |
| Stress Relax 30 mins @ 100 F. | | | |
| Loss @ 50% strain | 42 | 37 | 38 |

The data in Table 13 show that the polymers of the current invention when formulated with polyethylenes have surprisingly better properties in every category; higher tensile strength, higher moduli, better hysteresis recovery, lower permanent set and less stress relaxation than comparative SEBS C5.

Example 10

Polymer #17 was compounded with a low density polyethylene, NA952, density 0.91, MF 2.0 from Equistar Chemical, to improve toughness and reduce modulus. Blends containing 70% NA952 and 30% of either Polymer #17 of example 7 or C5 SEBS were prepared with a Brabender mixer under the conditions shown in Table 14. Surprisingly, the addition of Polymer #17 reduces the modulus while increasing elongation to break and tensile strength. While C5 reduces modulus, it also reduces tensile strength and elongation to break.

TABLE 14

| Run # | 1 | 2 | 3 |
|---|---|---|---|
| Polymer Type | | C5 | #17 |
| Polymer amount, % weight | | 30 | 30 |
| LDPE NA952, % weight | 100 | 70 | 70 |
| Irganox B215, % weight | | 0.5 | 0.5 |
| OBSERVATIONS | | | |
| Brabender Temp.(C.) | | 220 | 220 |
| Brabender-torque/rpm | | 66/304 | 63/312 |
| PROPERTIES | | | |
| Stress-Strain at 0.2 in/min | | | |
| Max. Stress at Break, MPa | 14 | 10.2 | 18.1 |
| Strain at Break, % | 604 | 606 | 717 |
| Stress at 25%, MPa | 7.7 | 4.1 | 4.6 |
| Stress at 100%, MPa | 8.0 | 4.8 | 5.5 |
| Stress at 300%, MPa | 9.5 | 6.3 | 8.0 |
| Stress at 500%, MPa | 12.8 | 9.1 | 13.2 |

Example 11

Compounds were made with the polymer of Example 7. The blends with polypropylene, HL508FB, 800 MFR from Borealis, and Epolene C-10, a LDPE from Eastman Chemical, shown in Table 15 were prepared in a WP twin screw extruder. Properties shown in Table 15 were measured on injection molded plaques and on strands extruded by the method of example 5.

TABLE 15

| Run # | 1 | | 2 | |
|---|---|---|---|---|
| Formulations, % weight: | | | | |
| C5 | — | | 75 | |
| #11 | 75 | | — | |
| PP HL508FB | 10 | | 10 | |
| Epolene C10 | 15 | | 15 | |
| Irganox 1010 | 0.2 | | 0.2 | |
| | 0.4 | | 0.4 | |
| Properties: | | | | |
| MFR (230° C./2.16 kg), g/10' | 15 | | 22 | |
| On plaques: | MD | PMD | MD | PMD |
| Modulus 100%, MPa | 3.1 | 2.0 | 2.0 | 1.8 |
| Tensile strength, MPa | 10.0 | 10.0 | 7.0 | 6.8 |
| Elongation at break, % | 670 | 680 | 860 | 900 |
| On strands: | | | | |
| Set, % | 14 | | 8 | |
| Stress relaxation at 40° C.: | | | | |
| Modulus 50%, t(0) | | | | |
| Modulus 50%, t(2h) MPa | 1.7 | | 1.3 | |
| F(t)/F(0), MPa | 0.8 | | 0.6 | |
| % | 51 | | 43 | |

Blends based on polymer #11 showed substantially higher strength and stiffness and significantly better stress relaxation when compared with the control polymer.

Example 12

Compounds containing 20% weight of a 5 melt flow polypropylene, were compounded with polymers of the current invention in a Brabender mixer. Polymer #7 is compared with a sequential S-EB-S Polymer, C4 in Table 16. Surprisingly, the polymer of the current invention shows improved strength and elongation to break relative to the sequential S-EB-S.

TABLE 16

| 80% Polymer/20% 5 MF PP | | |
|---|---|---|
| Polymer | C4 | 7 |
| Stress at Break, MPa | 12.4 | 14.7 |
| Elongation % | 701 | 945 |
| 50% modulus, MPa | 1.7 | 1.8 |

Similarly the same polymers were compounded with 80% of the same polypropylene in a Brabender mixing head. The data in Table 17 shows that the polymer of the current invention improves the elongation to break of the polypropylene which demonstrates improved toughness.

TABLE 17

| 20% Polymer/80% 5 MF PP | | |
|---|---|---|
| Polymer | C4 | 7 |
| Stress at Break MPa | 9.7 | 12.4 |
| Elongation % | 120 | 150 |

Example 13

In three experiments 5% of Polymer #7 was blended with 15% of a 5 melt flow Polypropylene and 80% of one of the following polyethylenes: Exact 8201, a 0.882 density metallocene LLDPE, or Exact 0201, a 0.902 density metallocene LLDPE, from Exxon Chemical or NA952, a 0.91 density LDPE from Equistar Chemical. The polymers were mixed in a Brabender mixer and pressed into plaques. The plaques were tensile tested according to ASTM D412. The addition of only 5% of Polymer #7 was effective at compatibilizing the polypropylene and polyethylene such that stress whitening did not occur during tensile elongation to more than 500% for any of the three polyethylenes.

Example 14

A film suitable for use in stretch wrap applications was prepared by blending 40% of the polymers of the current invention with PP X1804 polypropylene (40% w) having a MFR of 6, from Nippon Poly-Chem, and Regalite R-1125 tackifying resins (20% w) from Eastman Chemical. Ingredients and antioxidants were pre-blended in a Papenmeier internal mixer and compounded in a 25 mm Werner & Pfleiderer co-rotating twin-screw extruder with 49 L/D. Strands were cooled in a water-bath and granulated using a strand-cutter. Films were then blown on a Dr Collin film blowing line. Tensile properties were measured on the film samples, according to ASTM D882-81.

cyclohexane was added. Finally, 0.8 g of 2-ethylhexanol was added to the polymer solution. The final product consists of 71.2% 2-arm (linear) product, with an overall coupling efficiency (all coupled products/coupled products+uncoupled diblock) of about 92%. The styrene block has a molecular weight of 37,500 and the SB diblock has a molecular weight of 372,000 with a 1,2-butadiene content of ca. 60%. A sample of the polymer was hydrogenated to a residual olefin concentration of <0.5 meq/g in the presence of 10 ppm Co solution of a cobalt neodecanoate-aluminum triethyl catalyst (Al/Co=1.6 mol/mol). After hydrogenation under these conditions, the polymer remains 89% coupled. The catalyst was removed by washing with aqueous sulphuric acid, and the polymer was recovered via steam stripping, under conditions typical for hydrogenated polymers. The polymer was designated Polymer #18. Polymer #18 was compared against two other polymers—C6 is a full sequential hydrogenated SBS block copolymer having end blocks of about 29,000 mol weight, a 1,2-vinyl content for the midblock of about 67 mol percent, and contains about 31 weight percent styrene, while C7 is also a full sequential hydrogenated SBS block copolymer, but has a 1,2-vinyl content of about 40 mol percent and has a molecular weight about 50 percent larger than C6. The various polymers were compounded with a polypropylene, HP502L, and a process oil, Primol 352, in a Werner & Pfleiderer co-rotating twin-

TABLE 18

| Run# | | 1 | | 2 | | 3 | | 4 | |
|---|---|---|---|---|---|---|---|---|---|
| PP X1804 | | 40 | | 40 | | 40 | | 40 | |
| Regalite R1125 | | 20 | | 20 | | 20 | | 20 | |
| C4 | | 40 | | — | | — | | — | |
| #7 | | — | | 40 | | — | | — | |
| #5 | | — | | — | | 40 | | — | |
| #6 | | — | | — | | — | | 40 | |
| Irganox 1010 | | 0.2 | | 0.2 | | 0.2 | | 0.2 | |
| Irganox PS800 | | 0.2 | | 0.2 | | 0.2 | | 0.2 | |
| Film properties: | MPa | MD | TD | MD | TD | MD | TD | MD | TD |
| Modulus 100%, | MPa | 5.4 | 4.0 | 4.6 | 2.9 | 7.5 | 5.0 | 5.9 | 4.7 |
| Modulus 300%, | MPa | 7.4 | 4.9 | 7.1 | 3.7 | 14.9 | 7.5 | 8.9 | 5.8 |
| Modulus 500%, | MPa | 11.8 | 7.7 | 14.6 | 6.2 | — | 19.6 | 16.5 | 10.3 |
| Tensile strength, | % | 26.9 | 25.0 | 25.0 | 18.4 | 11.8 | 25.5 | 29.1 | 24.6 |
| | mm | 900 | | 680 | | 460 | | 680 | |
| Elongation at break, | g/10' | 1020 | | 850 | | 550 | | 760 | |
| | | 0.136 | | 0.103 | | 0.070 | | 0.090 | |
| Thickness, | | 21 | | 31 | | 23 | | 37 | |
| MFR (230° C./2.16 kg) | | | | | | | | | |

As shown in Table 18, compounds of the present invention have high anisotropy in films, combined with good strength and processability.

Example 15

In Example 15 a high molecular weight, high vinyl hydrogenated styrene/butadiene block copolymer of the present invention was prepared with a methyl trimethoxysilane coupling agent. A diblock polymer anion, S-B-Li, was first prepared as follows: 6 kg cyclohexane, 0.22 kg styrene and 4.8 g diethoxypropane were charged to a reactor at 60° C., followed by 30 g of a 2% w sec-butyl lithium solution in cyclohexane. After completion of the polymerization, 0.45 kg of butadiene was added and the reactor was heated to 80° C. After about 98% conversion of the butadiene, 11 g of a 5% w solution of methyl trimethoxysilane ("MTMS") in screw extruder as described in Example 4 above. The pellets were injection molded into plaques for compression set testing. The results in Table 19 show that the polymer of the current invention had similar compression set to C8 but much lower hardness. When compared to a polymer of similar hardness, C7, it showed superior compression set.

TABLE 19

| Block Polymer type | C8 | #18 | C7 |
|---|---|---|---|
| Polymer amount, parts by weight | 100 | 100 | 100 |
| Primol 352, pbw | 150 | 150 | 150 |
| HP502L, pbw | 30 | 30 | 30 |
| Hardness Shore A | | | |
| 0s | 49 | 37 | 38 |
| 30s | 43 | 32 | 32 |

TABLE 19-continued

| Block Polymer type | C8 | #18 | C7 |
|---|---|---|---|
| Compression Set | | | |
| 72 h 70° C. % | 35 | 37 | 45 |
| 24 h 100° C. % | 47 | 50 | 70 |

Example 16

The polymers of Example 15 were compounded with the same ingredients as in Example 15, but the amounts were as follows: 100 parts by weight block copolymer, 150 parts extending oil, and 60 parts polypropylene. The polymers were foamed and had resultant densities as shown in Table 20:

TABLE 20

| Block Polymer type | C8 | #18 | C7 |
|---|---|---|---|
| Polymer amount, parts by weight | 100 | 100 | 100 |
| Primol 352, pbw | 150 | 150 | 150 |
| HP502L, pbw | 60 | 60 | 60 |
| Density after foaming g/cm$^3$ | 0.6 | 0.5 | 0.5 |

The block polymer of the present invention combines the excellent foaming characteristics of C7 (low density after foaming) with the excellent high temperature performance of C8 (low compression set at 70 and 100° C.).

What is claimed is:

1. An article comprising at least one hydrogenated block copolymer composition and at least one other component selected from the group consisting of olefin polymers, styrene polymers, tackifying resins, polymer extending oils and engineering thermoplastic resins, said hydrogenated block copolymer composition comprising:
   a. a tetra-branched block copolymer (IV) having a number average molecular weight of 100,000 to 800,000 represented by the general formula (A-B)$_4$X;
   b. a tri-branched block copolymer (III) having a number average molecular weight of from 75,000 to 600,000 represented by the general formula (A-B)$_3$X;
   c. a di-branched block copolymer (II) having a number average molecular weight of from 50,000 to 400,000 represented by the general formula (A-B)$_2$X; and
   d. a linear diblock copolymer (I) having a number average molecular weight of from 25,000 to 200,000 represented by the general formula A-B; where:
      i. A represents a polymer block of a mono alkenyl arene;
      ii. B represents a polymer block of a hydrogenated conjugated diene;
      iii. X represents the residue of an alkoxy silane coupling agent having the formula R$_x$—Si—(OR')$_y$, where x is 0 or 1, x+y=4, and R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and
      iv. the relative amounts of copolymers IV, III, II and I are from 0 to 5 weight percent IV, from 0 to 60 weight percent III, from 40 to 95 weight percent II and from 2 to 10 weight percent I, where the total of I, II, III and IV equals 100 weight percent.

2. The article according to claim 1 wherein said mono alkenyl arene is styrene and said conjugated diene is selected from the group consisting of isoprene and butadiene.

3. The article according to claim 2 wherein said conjugated diene is butadiene, and wherein prior to hydrogenation about 10 to about 80 mol percent of the condensed butadiene units in block B have 1,2-configuration.

4. The article according to claim 2 wherein said conjugated diene is isoprene, and wherein prior to hydrogenation about 5 to about 80 mol percent of the condensed isoprene units in block B have 3,4-configuration.

5. The article according to claim 3 wherein said alkoxy silane coupling agent is selected from the group consisting of tetraethoxy silane, tetramethoxy silane, tetrabutoxy silane, methyl trimethoxy silane, methyl triethoxy silane, phenyl trimethoxy silane and isobutyl trimethoxy silane.

6. The article according to claim 5 wherein the amount of diblock copolymer I is from 4 to 8 percent.

7. The article according to claim 5 wherein said A blocks have a number average molecular weight of between about 3,000 and about 60,000, wherein said B blocks have a number average molecular weight of between about 20,000 and about 200,000, and wherein the weight ratio of polymer block A to polymer block B is from 5/95 to 50/50.

8. The article according to claim 7 comprising 100 parts by weight of said hydrogenated block copolymer composition and about 5 to about 300 parts by weight of a polymer extending oil.

9. The article according to claim 7 comprising 100 parts by weight of said hydrogenated block copolymer composition and about 5 to about 100 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

10. The article according to claim 7 comprising 100 parts by weight of said hydrogenated block copolymer composition and about 5 to about 100 parts by weight of a tackifying resin.

11. The article according to claim 7 comprising 100 parts by weight of said hydrogenated block copolymer composition and about 5 to about 100 parts by weight of a styrene polymer selected from the group consisting of crystal polystyrene, high impact polystyrene, syndiotactic polystyrene and acrylonitrile/butadiene/styrene terpolymer.

12. The article according to claim 8 also comprising about 5 to about 100 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

13. The article according to claim 12 wherein said prior to hydrogenation about 60 to about 80 mol percent of the condensed butadiene units in block B have 1,2-configuration.

14. The article according to claim 12 also comprising about 5 to about 100 parts by weight of a tackifying resin.

15. The article according to claim 12 also comprising about 5 to about 100 parts by weight of a styrene polymer selected from the group consisting of crystal polystyrene, high impact polystyrene, syndiotactic polystyrene and acrylonitrile/butadiene/styrene terpolymer.

16. The article according to claim 15 also comprising about 5 to about 100 parts by weight of a tackifying resin.

17. The article according to claim 12 also comprising about 2 to about 80 percent by weight of a filler based on the total weight of the article.

18. The article according to claim 10 wherein said tackifying resin is a midblock compatible resin or a polystyrene block compatible resin.

19. The article according to claim 10 wherein said tackifying resin includes both a midblock compatible resin and a polystyrene block compatible resin.

20. The article according to claim 7 comprising about 5 to about 95 percent by weight of said hydrogenated block copolymer composition and about 95 to about 5 percent by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

21. The article according to claim 20 wherein said olefin polymer is selected from the group consisting of propylene homopolymers, propylene/alpha olefin copolymers, propylene/vinyl aromatic copolymers, and high impact polypropylene.

22. The article according to claim 7 wherein said conjugated diene is butadiene, and wherein prior to hydrogenation about 10 to about 45 mol percent of the condensed butadiene units in block B have 1,2-configuration.

23. The article according to claim 22 comprising 100 parts by weight of said hydrogenated block copolymer composition and about 5 to about 100 parts by weight of an olefin polymer selected from the group consisting of ethylene homopolymers, ethylene/alpha olefin copolymers, ethylene/vinyl aromatic copolymers, propylene homopolymers, propylene/alpha olefin copolymers, propylene/vinyl aromatic copolymers, high impact polypropylene, and ethylene/vinyl acetate copolymers.

24. The article according to claim 23 also comprising about 5 to about 100 parts by weight of a tackifying resin.

25. The article according to claim 24 wherein said olefin polymer is selected from the group consisting of propylene homopolymers, propylene/alpha olefin copolymers, propylene/vinyl aromatic copolymers, and high impact polypropylene, and said tackifying resin is a polystyrene block compatible resin.

26. The article according to claim 7 also comprising about 2 to about 80 percent by weight of a filler based on the total weight of the article.

27. The article according to claim 26 wherein said filler is calcium carbonate.

28. The article according to claim 1 wherein the article is in the form of a film, sheet, coating, band, strip, profile, molding, foam, tape, fabric, thread, filament, ribbon, fiber, plurality of fibers or fibrous web.

29. The article according to claim 1 wherein said article is formed in a process selected from the group consisting of injection molding, over molding, dipping, extrusion, roto molding, slush molding, fiber spinning, film making or foaming.

30. The article according to claim 1 also comprising an S-EB-S block copolymer.

31. The article according to claim 30 comprising 100 parts by weight of said hydrogenated blocky copolymer composition and about 5 to about 100 parts by weight of said S-EB-S block copolymer.

32. The article according to claim 7 comprising about 5 to about 95 percent by weight of a styrene polymer and about 95 to about 5 percent by weight of said hydrogenated block copolymer composition.

33. An article comprising at least one hydrogenated block copolymer composition and at least one other component selected from the group consisting of olefin polymers, styrene polymers, tackifying resins, polymer extending oils, fillers, reinforcements, lubricants and engineering thermoplastic resins, said hydrogenated block copolymer composition comprising:
   a. a tetra-branched block copolymer (IV) having a number average molecular weight of from 100,000 to 800,000 represented by the general formula (C-D-E)$_4$X;
   b. a tri-branched block copolymer (III) having a number average molecular weight of from 75,000 to 600,000 represented by the general formula (C-D-E)$_3$X;
   c. a di-branched block copolymer (II) having a number average molecular weight of from 50,000 to 400,000 represented by the general formula (C-D-E)$_2$X; and
   d. a linear diblock copolymer (I) having a number average molecular weight of from 25,000 to 200,000 represented by the general formula C-D-E; where:
      i. D represents a polymer block of a mono alkenyl arene;
      ii. C and E represent polymer blocks of a hydrogenated conjugated diene;
      iii. X represents the residue of an alkoxy silane coupling agent having the formula $R_x$—Si—$(OR')_y$, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals; and
      iv. the relative amounts of copolymers I, II, III and IV are from 0 to 5 weight percent IV, from 0 to 60 weight percent III, from 40 to 95 weight percent II and from 2 to 10 weight percent I, where the total of I, II, III and IV equals 100 weight percent.

34. The article according to claim 33 wherein said conjugated diene is selected from the group consisting of butadiene and isoprene and said mono alkenyl arene is styrene.

35. The article according to claim 34 wherein said D blocks are styrene polymer blocks and said C and E blocks are butadiene polymer blocks, and wherein prior to hydrogenation about 10 to about 80 mol percent of the condensed butadiene units in blocks C and E have 1,2-configuration.

36. The article according to claim 34 wherein said D blocks are styrene polymer block, said C blocks are isoprene polymer blocks where prior to hydrogenation about 5 to about 80 mol percent of the condensed isoprene units have 3,4-configuration, and said D blocks are butadiene polymer blocks where prior to hydrogenation about 10 to about 80 mol percent of the condensed butadiene units have 1,2-configuration.

37. The article according to claim 35 wherein said block copolymer composition is selectively hydrogenated such that greater than 95% of the olefinic unsaturation in the C and E blocks have been reduced.

38. The article according to claim 37 wherein said alkoxy silane is selected from the group consisting of tetraethoxy silane, tetramethoxy silane, tetrabutoxy silane, methyl trimethoxy silane, methyl triethoxy silane, phenyl trimethoxy silane and isobutyl triethoxy silane.

39. The article according to claim 38 wherein the weight percent of D polymer blocks in the block copolymer composition is from 5 weight percent to 50 weight percent.

40. The article according to claim 39 wherein the weight ratio of C blocks to E blocks is from 10:90 to 90:10.

41. The article according to claim 40 comprising 100 parts by weight of said hydrogenated block copolymer composition and about 5 to about 300 parts by weight of a polymer extending oil.

42. The article according to claim 40 comprising 100 parts by weight of said hydrogenated block copolymer composition and about 5 to about 100 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

43. The article according to claim 40 comprising 100 parts by weight of said hydrogenated block copolymer composition and about 5 to about 100 parts by weight of a tackifying resin.

44. The article according to claim 40 comprising 100 parts by weight of said hydrogenated block copolymer composition and about 5 to about 100 parts by weight of a styrene polymer selected from the group consisting of crystal polystyrene, high impact polystyrene, syndiotactic polystyrene and acrylonitrile/butadiene/styrene terpolymer.

45. The article according to claim 41 also comprising about 5 to about 100 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

46. The article according to claim 42 wherein said prior to hydrogenation about 60 to about 80 mol percent of the condensed butadiene units in block B have 1,2-configuation.

47. The article according to claim 46 also comprising about 5 to about 100 parts by weight of a tackifying resin.

48. The article according to claim 47 also comprising about 5 to about 100 parts by weight of a styrene polymer selected from the group consisting of crystal polystyrene, high impact polystyrene, syndiotactic polystyrene and acrylonitrile/butadiene/styrene terpolymer.

49. The article according to claim 46 wherein said tackifying resin is a midblock compatible resin.

50. The article according to claim 46 wherein said tackifying resin is a polystyrene block compatible resin.

51. The article according to claim 46 wherein said tackifying resin includes both a midblock compatible resin and a polystyrene block compatible resin.

52. The article according to claim 2 wherein the conjugated dienes in said block B comprise a mixture of butadiene and isoprene.

53. The article according to claim 52 wherein the weight ratio of isoprene to butadiene is between about 1:4 to about 4:1.

* * * * *